United States Patent [19]

Yuni

[11] Patent Number: 4,486,854
[45] Date of Patent: Dec. 4, 1984

[54] FIRST-IN, FIRST-OUT MEMORY SYSTEM
[75] Inventor: William Yuni, Randolph, Mass.
[73] Assignee: Codex Corporation, Mansfield, Mass.
[21] Appl. No.: 311,742
[22] Filed: Oct. 15, 1981
[51] Int. Cl.³ .................. G06F 13/00; G11C 14/00
[52] U.S. Cl. .................................................... 364/900
[58] Field of Search ... 364/200 MS File, 900 MS File

[56] References Cited

U.S. PATENT DOCUMENTS

| | | | |
|---|---|---|---|
| 3,153,776 | 1/1964 | Schwartz | 340/172.5 |
| 3,297,950 | 1/1967 | Lee | 328/37 |
| 3,311,891 | 3/1967 | Brady et al. | 340/172.5 |
| 3,493,938 | 2/1970 | Cuccio | 340/173 |
| 3,579,203 | 5/1971 | Malmer | 340/173 |
| 3,629,857 | 12/1971 | Faber | 340/172.5 |
| 3,708,690 | 1/1973 | Paivinen | 307/221 |
| 3,893,086 | 7/1975 | Nanya | 340/173 |
| 3,953,838 | 4/1976 | Gilberg et al. | 340/173 |
| 4,027,288 | 5/1977 | Barton et al. | 364/200 |
| 4,062,059 | 12/1977 | Suzuki et al. | 364/900 |
| 4,070,630 | 1/1978 | Hepworth et al. | 328/63 |
| 4,138,732 | 2/1979 | Suzuki et al. | 364/900 |
| 4,145,755 | 3/1979 | Suzuki et al. | 364/900 |
| 4,151,598 | 4/1979 | Webster | 364/900 |
| 4,151,609 | 4/1979 | Moss | 365/221 |
| 4,159,532 | 6/1979 | Getson, Jr. et al. | 364/900 |
| 4,161,778 | 7/1979 | Getson, Jr. et al. | 364/900 |
| 4,163,291 | 7/1979 | Suzuki et al. | 365/221 |
| 4,222,102 | 9/1980 | Jansen et al. | 364/200 |

Primary Examiner—Gareth D. Shaw
Assistant Examiner—John G. Mills

[57] ABSTRACT

Independent loading and first-in, first-out reading of a sequence of data words in a data store is controlled by pointers which independently indicate the next-to-be-loaded and next-to-be-read stages in the data store, the pointers being updated after each loading and reading; half-full flag circuitry indicates when at least half of the stages are occupied; and the number of stages available for storing can be selectably changed.

17 Claims, 21 Drawing Figures

| STEP NO. | PREVIOUS OPERATION | PRESENT STATUS | CONTROL REGISTER |
|---|---|---|---|
| 1a | INITIALIZE | MT | $c_0$ [1][0] ... [0] $c_{n+1}$ |
| 2a | WRITE | MT* | [1][1][0] ... [0] |
| 3a | WRITE | MT*, HF* | [1][1] ... [1][0] ... [0]  ($c_{n/2}$) |
| 4a | WRITE | HF | [1][1] ... [1][0] ... [0]  ($c_{n/2}$) |
| 5a | WRITE | HF, F* | [1] ... [1][0][0]  ($c_n$) |
| 6a | WRITE | F | [1] ... [1][0]  ($c_n$) |

FIG 4A

| STEP NO. | PREVIOUS OPERATION | PRESENT STATUS | CONTROL REGISTER |
|---|---|---|---|
| 1b | INITIALIZE | MT | $c_0$ [1][0] ... [0] $c_{n+1}$ |
| 2b | WRITE | MT* | [1][1][0] ... [0] |
| 3b | READ | MT | [0][1][0] ... [0] |
| 4b | WRITE | MT* | [0][1][1][0] ... [0] |
| 5b | WRITE | MT*, HF* | [0][1][1][1] ... [1][0] ... [0]  ($c_{n/2}$) |
| 6b | WRITE | HF | [0][1] ... [1][1][0] ... [0]  ($c_{n/2}$) |
| 7b | WRITE | HF, F* | [0][1] ... [1][0]  ($c_n$) |
| 8b | WRITE | F | [0][1] ... [1] |

FIG 4B

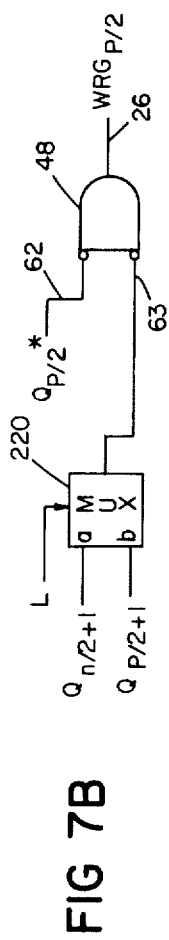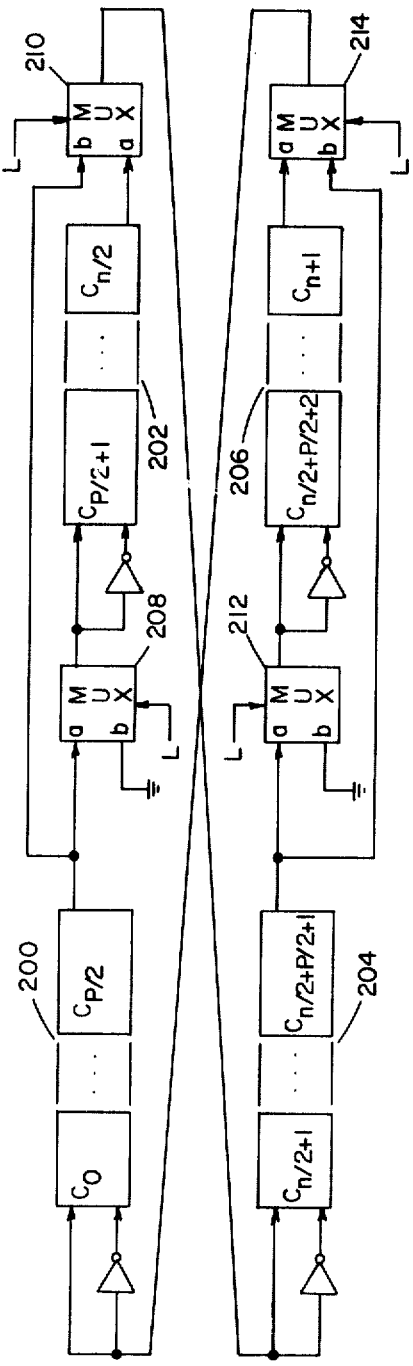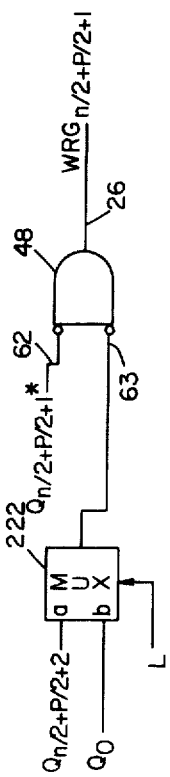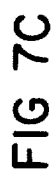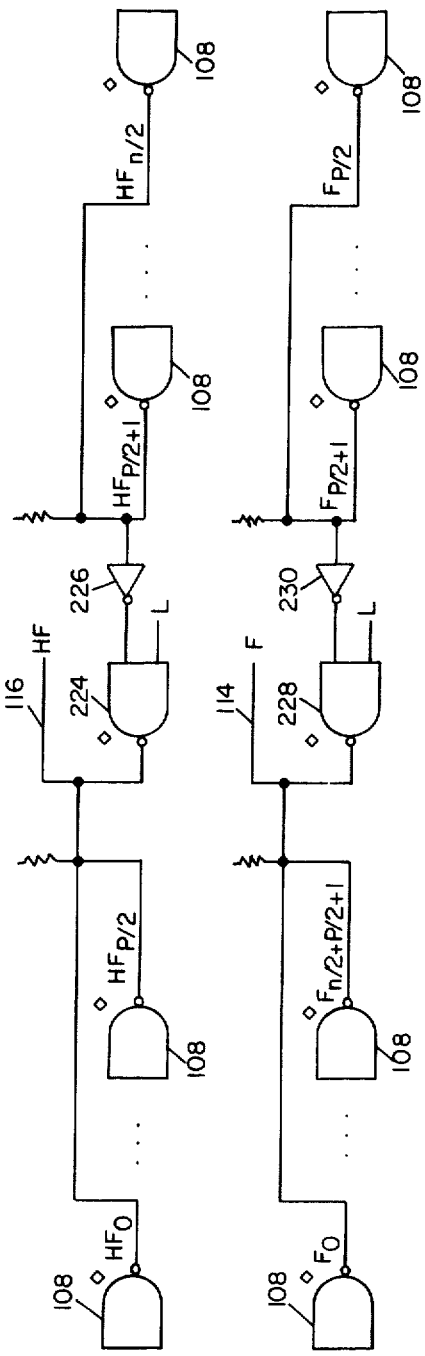
FIG 7B  FIG 7A  FIG 7C  FIG 7D  FIG 7E

FIRST-IN, FIRST-OUT MEMORY SYSTEM

BACKGROUND OF THE INVENTION

This invention relates to controlling first-in, first-out data storage systems.

In a data processing system having a source providing data to a user, the source may need to provide data at the same time as, but at a different rate than, the user is able to accept it. A first-in, first-out memory can be used to temporarily store the provided data until the user can accept it.

SUMMARY OF THE INVENTION

In one aspect, the invention features apparatus for controlling the loading and first-in, first-out reading of a sequence of data words in a data store, the data store comprising a plurality of stages, the apparatus comprising pointer circuitry connected to specify the next-to-be-loaded stage and to specify independently the next-to-be-read stage, a loader responsive to the pointer circuitry and connected to enable loading the next data word in the sequence to be loaded, a reader responsive to the pointer circuitry and connected to enable reading, independently of the loader, the next data word in the sequence to be read, and pointer update circuitry for updating the pointer circuitry after each loading and after each reading.

In preferred embodiments, the stages are arranged consecutively and the data words in the sequence are loaded respectively into consecutive stages, and the pointer circuitry comprises a register of elements arranged in a continuous ring, each of the elements being associated with one of the stages, each of the elements being in a first state when the corresponding stage either contains a data word or immediately succeeds the stage containing the last loaded data word, each of the elements otherwise being in a second state, whereby the next-to-be-loaded one of the stages is specified by the corresponding element which is in the first state when the next succeeding element is in the second state, and the next-to-be-read stage is specified by the corresponding element which is in the first state when the immediately preceding element is in the second state; load timing circuitry is included and connected to trigger the loader to enable the loading; read timing circuitry is included and connected to trigger the reader to enable the reading; control circuitry is included to disable the loader when the data store is full; the data store is treated as full when all but two of the stages contain data words; control circuitry is included to disable the reader when the data store is empty; and the pointer update circuitry comprises load update circuitry responsive to the completion of the loading of each data word and connected to cause the element succeeding the element which had specified the next-to-be-loaded stage to change to the first state, and read update circuitry responsive to the completion of the reading of each data word and connected to cause the element which had specified the next-to-be-read stage to change to the second state.

In another aspect, the invention features apparatus for indicating the occupancy status of a first-in, first-out data storage system, the system comprising a sequence of stages, the apparatus comprising occupancy sensing circuitry connected to indicate the occupied or unoccupied status of each stage, and half-full flag circuitry responsive to the occupancy sensing circuitry and connected to indicate when at least half of the stages are occupied In preferred embodiments, the sequence is split into two sub-sequences having equal numbers of stages, each stage in each of the sub-sequences being associated with one of the stages of the other sub-sequence, and the half-full flag circuitry comprises a plurality of half-full indicators, each indicator being associated with one of the stages in one of the sub-sequences and with the corresponding stage in the other sub-sequence, each of the indicators being connected to provide an at-least-half-full signal when both of its associated stages are occupied; full flag circuitry is included, responsive to the occupancy sensing circuitry, and connected to indicate when all of the stages are occupied; empty flag circuitry is included, responsive to the occupancy sensing circuitry, and connected to indicate when all of the stages are unoccupied; the full flag circuitry comprises a plurality of not-full indicators, each indicator being associated with one of the stages and with the preceding stage in the sequence, each indicator being connected to provide a not-full signal when both associated stages are unoccupied; and the empty flag circuitry comprises a plurality of not-empty indicators, each indicator being associated with one of the stages and with the preceding stage in the sequence, each indicator being connected to provide a not-empty signal when both of the associated stages are occupied.

In another aspect, the invention features a variable-size data store for storing and first-in, first-out reading of a sequence of data words comprising a plurality of storage stages, linking circuitry for causing a group of at least some of the storage stages to be available for storing, and size selector circuitry for selectably causing the linking circuitry to change the number of the storage stages in the group.

In preferred embodiments, the data store further comprises a sequence of enabling elements, each of the elements being associated with one of the stages for enabling the corresponding stage to be loaded or read, the sequence being split into a first part and a second part, and wherein the linking circuitry selectably connects or disconnects the first part and the second part; and each of the first and second parts is split into a first subpart and a second subpart, the first subparts having equal numbers of elements and the second subparts having equal numbers of elements, and the linking circuitry further comprises four multiplexers, one of the multiplexers connecting each two of said subparts, the apparatus further comprises occupancy sensing circuitry connected to indicate the occupied or unoccupied states of each stage, and half-full flag circuitry responsive to the occupancy sensing circuitry and connected to selectably indicate when at least half of the stages, or at least half of the stages associated with the first part, are occupied The invention enables quick, efficient, and economical asynchronous reading and loading in a first-in, first-out data storage system, while providing accurate, continuously available, full, half-full and empty status indicators; the length of the data store is selectable to permit speed and efficiency.

Other features and advantages of the invention will be apparent from the following description of the preferred embodiment, and from the claims

DESCRIPTION OF THE PREFERRED EMBODIMENT

We turn now to the structure and operation of the preferred embodiment, first briefly describing the drawings thereof.

DRAWINGS

FIGS. 4A and 4B are tables of the status of the control register of FIG. 3A at each step in two different representative sequences of data loading and reading steps.

FIG. 7A is a block diagram of a split configuration of the control register of FIG. 3A;

FIGS. 7B, 7C, 7D and 7E are block diagrams of a representative gating circuitry associated with the split configuration of FIG. 7A.

STRUCTURE

Figure 1:
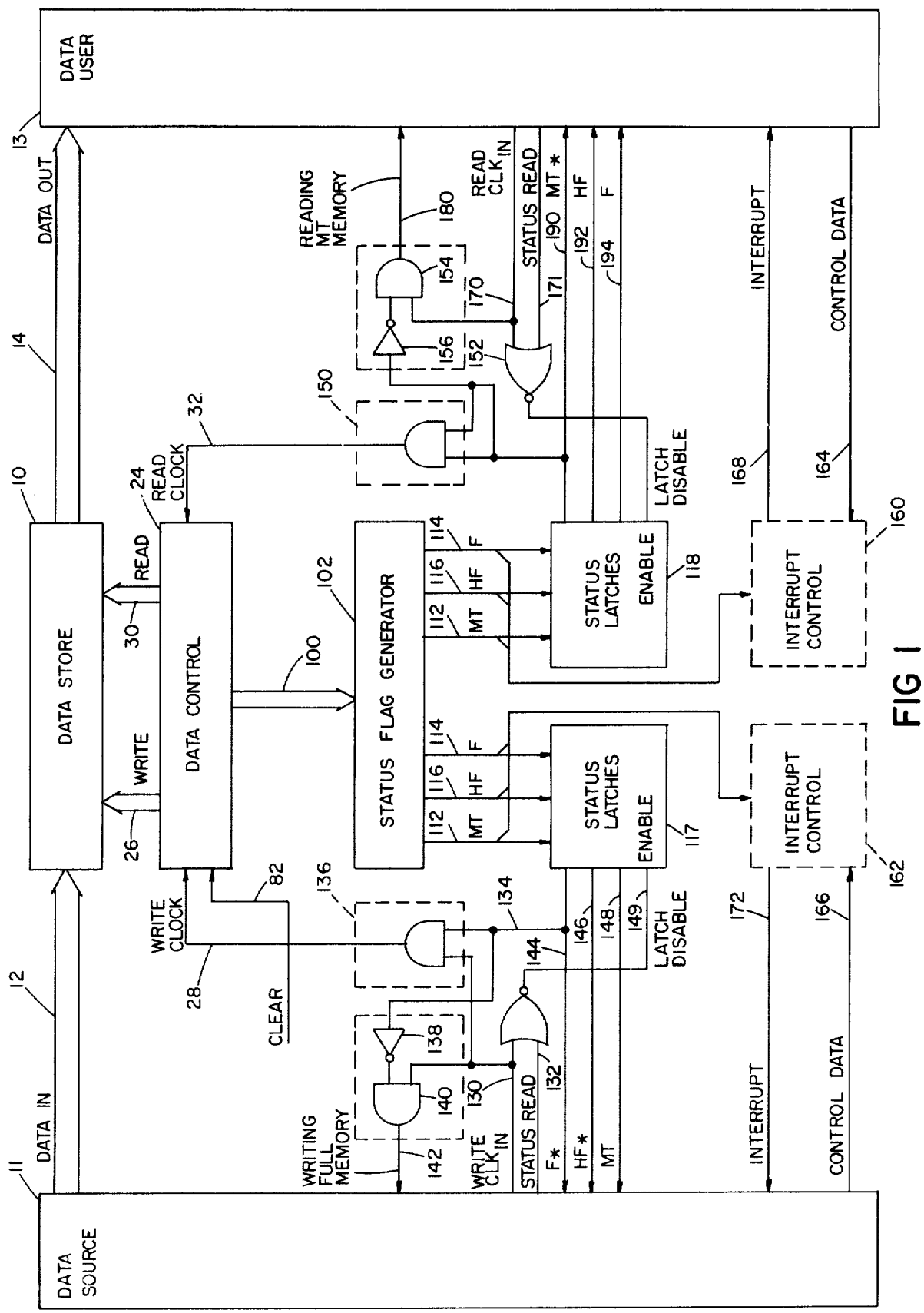
FIG. 1 is a block diagram of a first-in, first-out data storage system.

Referring to FIG. 1, a data storage system includes data store 10 into which sequences of data words (each w bits wide) are written by data source 11 through input data line 12 and from which data words are read by data user 13 through output data line 14 at a different speed, at the same time, and in the same order (i.e., first-in, first-out or FIFO) as the data words are written.

Figure 2A:
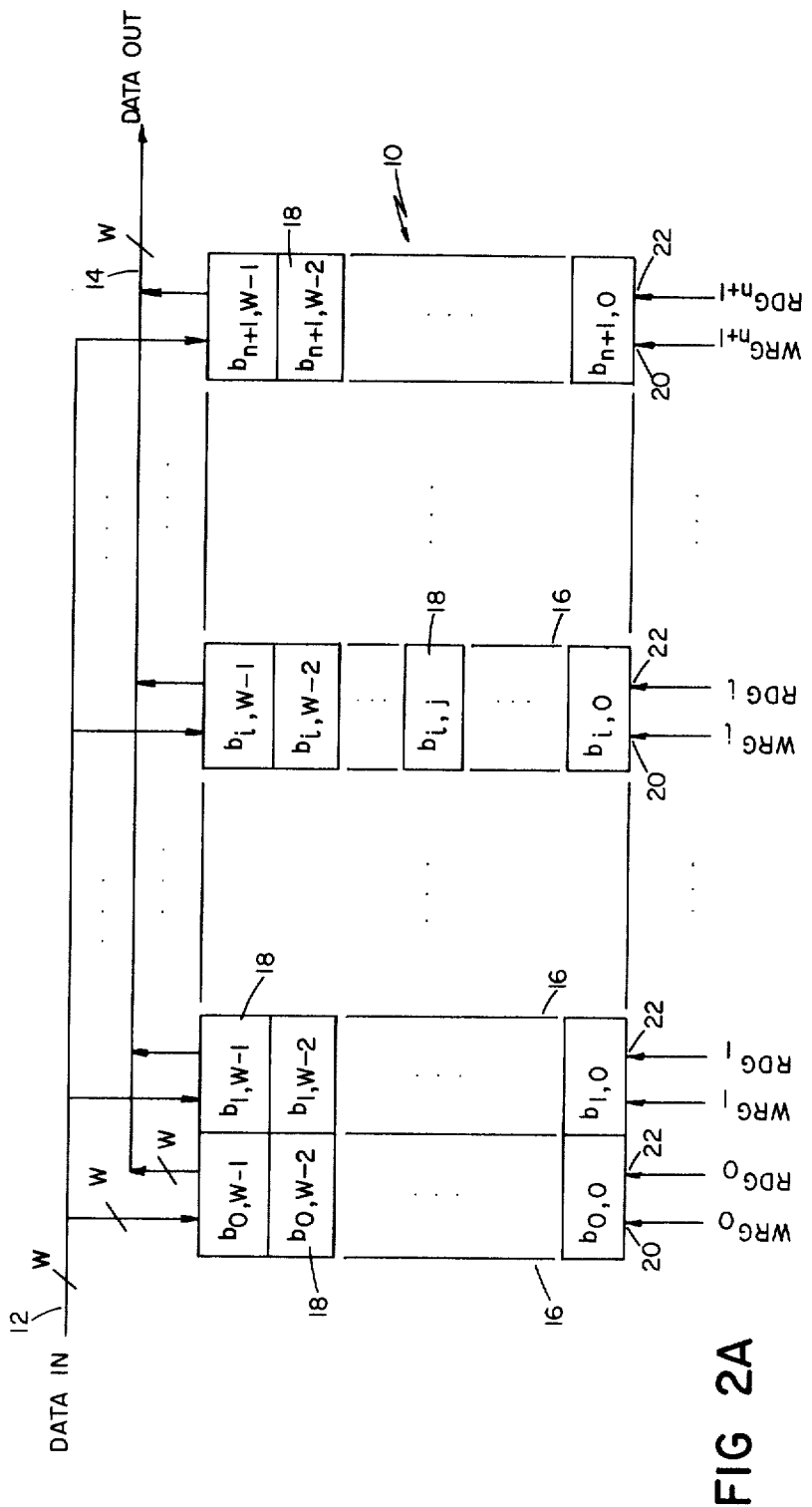
FIG. 2A is a block diagram of representative stages of the data store of FIG. 1.

As shown in FIG. 2A, data store 10 has a series of n+2 stages ($b_o$ through $b_{n+1}$) 16, where n is the maximum usable storage capacity of data store 10.

Figure 2B:
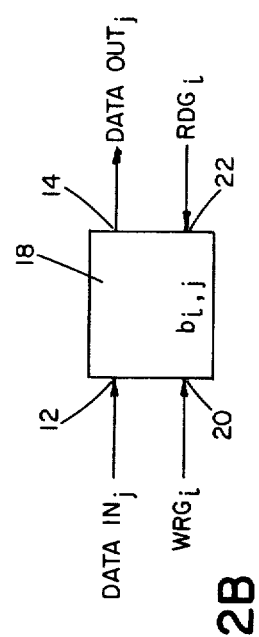
FIG. 2B is a block diagram of a representative memory element in the data store of FIG. 1.

The ith stage 16 contains w one-bit storage locations ($b_{i,o}$ through $b_{i,w-1}$) 18 for holding a data word of w bits. Input data line 12 and output data line 14 each have w parallel lines so that all bits of each w-bit data word can be carried simultaneously. Each stage 16 has a write input 20 and a read input 22. Referring to FIG. 2B, a given storage location 18, such as $b_{i,j}$ (i.e., the location corresponding to the jth bit of the ith stage), is connected to the jth line of input data line 12 and stores the bit appearing on that jth line when the ith write triggering signal, $WRG_i$, appears at input 20. Location $b_{i,j}$ similarly reads out the jth bit on the jth line of output data line 14 when the ith read triggering signal, $RDG_i$, appears at input 22. Therefore, when the $WRG_i$ signal is applied to the ith stage 16, the respective storage locations $b_{i,o}$ through $b_{i,w-1}$ store the bits of the data word then appearing on input data line 12; and when the $RDG_i$ signal is applied to the ith stage 16, the respective storage locations $b_{i,o}$ through $b_{i,w-1}$ apply the respective bits of the stored data word onto output data line 14.

Returning to FIG. 1, write line 26 comprises the n+2 lines which carry the write signals, $WRG_o$ through $WRG_{n+1}$, to the respective n+2 stages 16 of data store 10; and read line 30 comprises the n+2 lines which carry the respective read signals, $RDG_o$ through $RDG_{n+1}$ to the n+2 stages 16 of data store 10.

When a data word on line 12 is to be stored, data control 24 (acting as a write enabler) provides a write (WRG) signal to the appropriate stage 16; and when a data word is to be read onto line 14, data control 24 (acting as a read enabler) provides a read signal (RDG) to the appropriate stage 16.

Figure 3A:
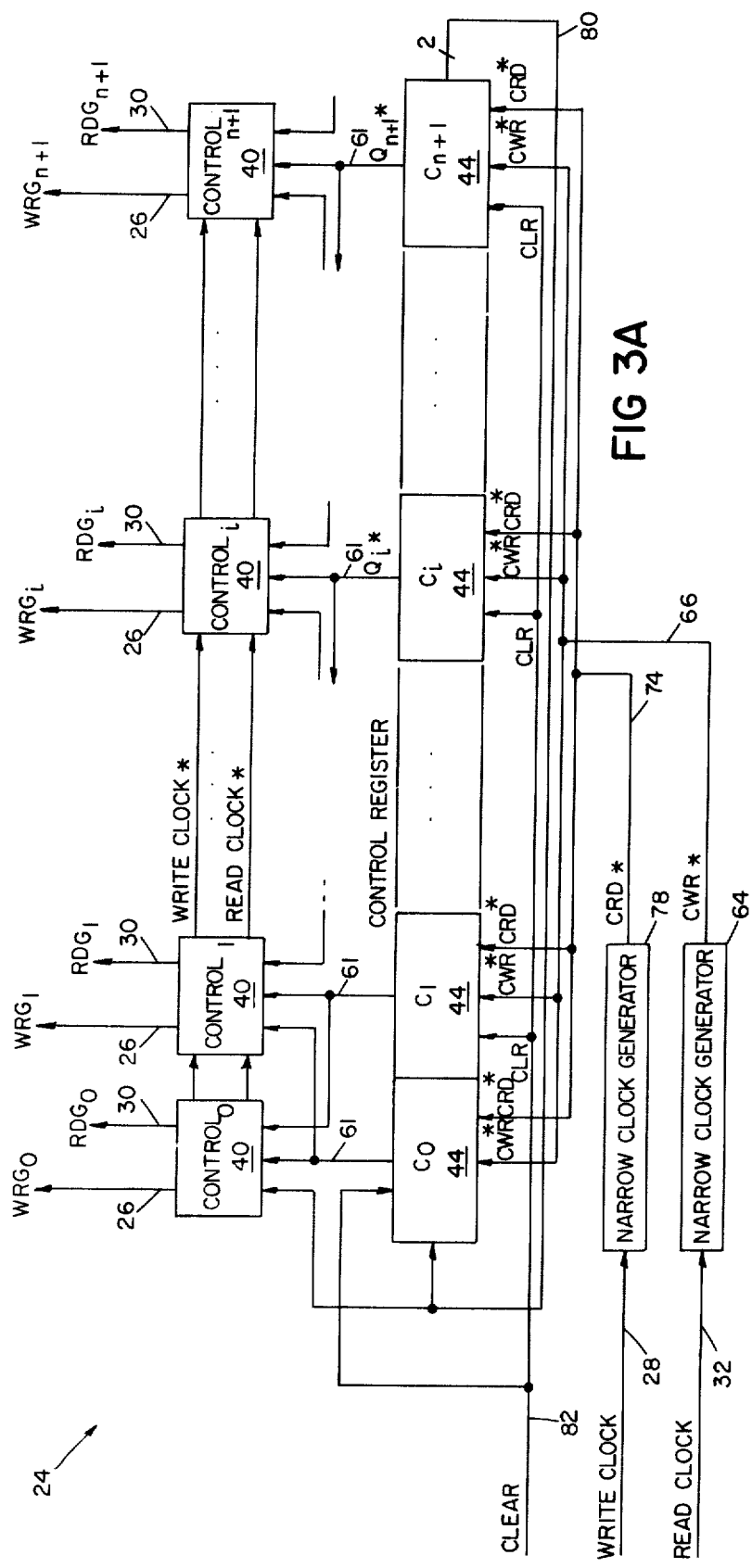
FIG. 3A is a block diagram of representative elements of the data control of FIG. 1.

Referring to FIG. 3A, data control 24 includes n+2 controllers 40, one controller 40 being associated with each stage 16, and control register 42 having a series of n+2 register elements ($C_o$ through $C_{n+1}$) 44, one register element 44 being associated with each controller 40. The ith controller 40 is arranged to provide to the corresponding ith stage 16 the ith write signal ($WRG_i$) on line 26 when the next-in data word is to be stored in the ith stage 16, and the ith read signal ($RDG_i$) on line 30 when the next-out data word is to be read from the ith stage.

Figure 3C:
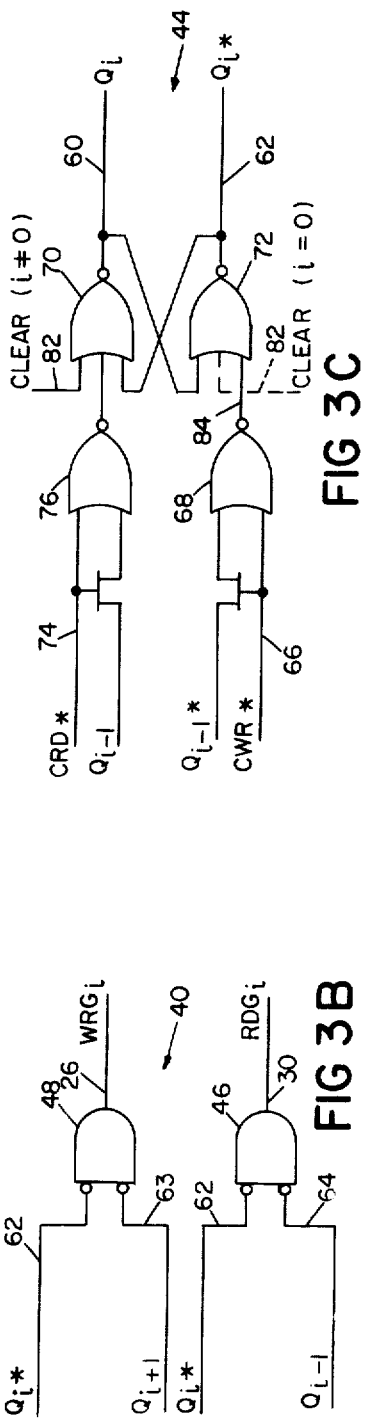
FIG. 3C is a block diagram of the gating circuitry of a representative control register element of FIG. 3A.
Figure 3B:
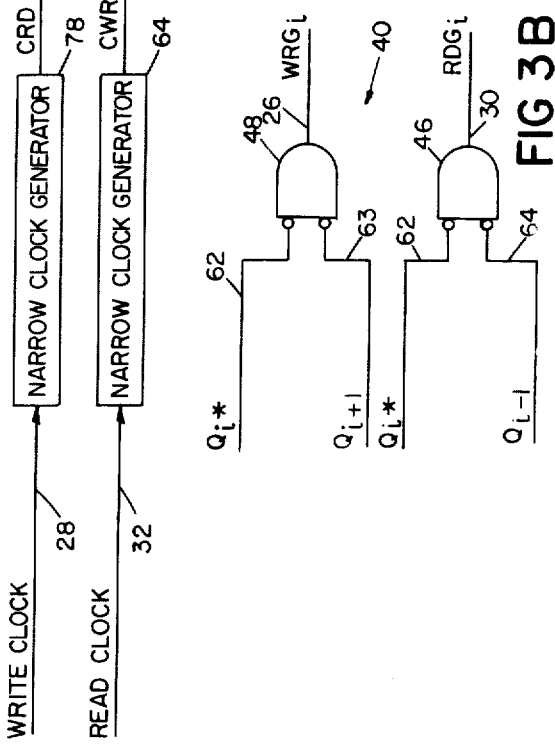
FIG. 3B is a block diagram of the gating circuitry of a representative control element of FIG. 3A.

As shown in FIG. 3B, the ith controller 40 has a read gate 46 and a write gate 48. If the ith register element 44 is in a logical 1 state $Q_i$, indicated as a logical 0 state $Q_i^*$ on line 62, and if the i+1 register element 44 is in a logical 0 state $Q_{i+1}$, as indicated on line 63, then write clock signal $WRG_i$ is provided by write gate 48 on line 26 and the data word then on line 12 is written into the ith stage 16. Accordingly the next-in data word is always written into the ith stage 16 when its corresponding register element 44 (acting as a write pointer) is in a logical 1 state $Q_i$ at the same time that the i+1 register element is in a logical 0 state $Q_{i+1}$.

Similarly, a read signal $RDG_i$ is provided by gate 46 of the ith controller 40 on line 30 only if the ith register element 44 is in a logical 1 state $Q_i$, indicated as a logical 0 state $Q_i^*$ on line 62, and the i−1 register element 44 is in a logical 0 state $Q_{i-1}$, as indicated on line 64. Accordingly the data word is always read from the ith stage 16 when its corresponding register element 44 (acting as a read pointer) is in a logical 1 state $Q_i$ at the same time the i−1 register element is in a logical 0 state $Q_{i-1}$.

Referring to FIG. 3C, the ith register element 44 can occupy one of two logical states and provides state indicators $Q_i$ and $Q_i^*$ (the logical inverse of $Q_i$) on lines 60 and 62 respectively, based on inputs CRD*, $Q_{i-1}$, $Q_{i-1}^*$, CWR* and Clear (Lines 60 and 62 together comprise line 61 on FIG. 3A connecting the ith register element to the ith, i+1 and i−1 controllers 40). In general, the state $Q_i$ of the ith register element 44 is logical 1 when the ith stage 16 contains a data word or is the stage into which the next-in word is to be written and otherwise is logical 0. The state of each register element 44 is updated at the end of each read clock signal or write clock signal received on line 28 or line 32.

The ith register element 44 includes two NOR gates 70, 72 which act as a flip-flop so that when the state $Q_i$ of gate 70 is logical 1, the state $Q_i^*$ of gate 72 will be logical 0 and vice versa. NOR gates 68 and 76 act as shifters to update the status of register element 44.

At the trailing edge of each write clock signal which appears on line 28, narrow clock generator 64 provides a CWR* signal on line 66 indicating that a write operation has just been completed. CWR* is normally a logical 1, but becomes a logical 0 at the end of each write clock signal which appears on line 28. CWR* triggers the updating of the status of each register element 44. When a CWR* signal becomes a logical 0 on line 66, the state of the ith register element 44 is updated in accordance with the following table, depending on the states immediately prior to the CWR* signal

| Before CWR* | | After CWR* | |
|---|---|---|---|
| $Q_{i-1}$ | $Q_i$ | $Q_{i-1}$ | $Q_i$ |
| 0 | 0 | 0 | 0 |
| 0 | 1 | 0 | 1 |
| 1 | 0 | 1 | 1 |
| 1 | 1 | 1 | 1 |

Therefore, state $Q_i$ is changed (from 0 to 1) only when $Q_i$ was 0 and $Q_{i-1}$ was 1 prior to the CWR* signal. In that situation the incoming data word was written into the $i-1$ stage 16 and the next-in data word is to be written into the ith stage 16.

Conversely, at the trailing edge of each read clock signal which appears on line 32, narrow clock generator 78 places a CRD* = logical 0 signal on line 74, which causes states $Q_i$ and $Q_i^*$ to be updated in accordance with the following table.

| Before CRD* | | After CRD* | |
|---|---|---|---|
| $Q_{i-1}$ | $Q_i$ | $Q_{i-1}$ | $Q_i$ |
| 0 | 0 | 0 | 0 |
| 0 | 1 | 0 | 0 |
| 1 | 0 | 1 | 0 |
| 1 | 1 | 1 | 1 |

Therefore, state $Q_i$ is changed (from 1 to 0) only when $Q_i$ was 1 and $Q_{i-1}$ was 0 prior to the CRD* signal. In that situation, the last outgoing data word was read from the ith stage 16 and the next-out data word will be read from the $i+1$ stage 16.

Control register 42 may be considered a half shift register because each time a write clock signal appears on line 28, all logical 1's are effectively shifted while 0's are ignored, and each time a read clock signal appears on line 32, all logical 0's are effectively shifted while 1's are ignored. Control register 42 operates in the normal mode, only one register element 44 changing states at a time, thereby minimizing noise generation.

In FIG. 3A, the last register element 44 $C_{n+1}$ has its outputs connected by line 80 to the inputs of the first register element $C_o$ 44 and the corresponding controller 40, so that register 42 effectively forms a continuous ring of register elements 44.

Control register 42 can be cleared and readied for operation by the assertion of a signal on clear line 82. Clear line 82 is connected to gate 70 of each register element 44, except for register element $C_o$ which has its gate 72 connected to clear line 82. When a clear signal appears on line 82, state Q of all register elements 44 becomes logical 0, except that state Q of register element $C_o$ becomes logical 1. The ith write gate 48 continually provides a write signal (WRG$_i$) whenever the ith register element 44 is in a logical 1 state $Q_i$, and the $i+1$ register element 44 is in a logical 0 state. In those circumstances, the ith write gate 48 is effectively pointing to the ith (empty) stage 16 of data store 10, and no problem arises from permitting data source 11 to continuously write data into the ith stage 16. When the CWR* signal causes a status update, the data word then being written into the ith stage is effectively stored. Similarly the next-out data word is being continually read until a CRD* signal causes a status update of the register elements 44.

Figure 5A:
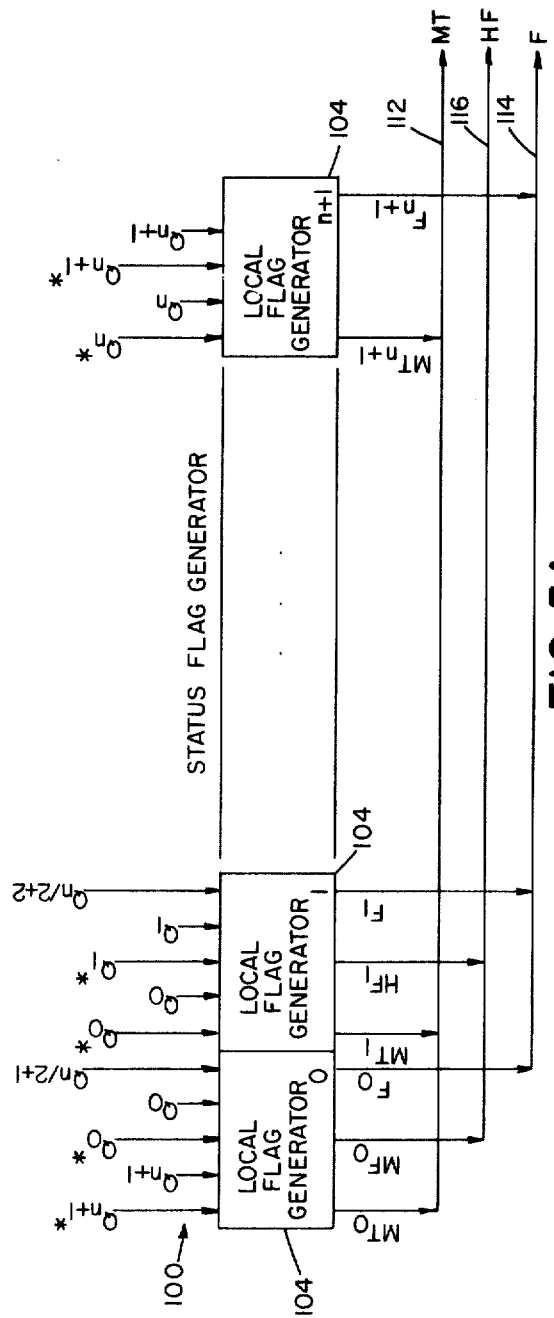
FIG. 5A is a block diagram of representative local flag generators of the status flag generators of FIG. 1.

Returning to FIG. 1, data control 24 provides signals over status lines 100 to status flag generator 102, indicating the states Q and Q* of the $n+2$ register elements 44. Referring to FIG. 5A, status flag generator 102 has $n+2$ local flag generators 104 corresponding to the $n+2$ register elements 44. The ith local flag generator 104 receives as input on appropriate status lines 100 the states $Q_{i-1}$ and $Q_{i-1}^*$ of the preceding register element 44, the states, $Q_i$ and $Q_i^*$ of the ith register element, and the state $$Q_{\frac{n}{2}+i+1}$$

of the $$\frac{n}{2}+i+1$$

register element 44. Referring to FIG. 5B, the ith local flag generator 104 has three NAND gates 106, 108 110. Only if both the ith and the $i-1$ register elements 44 are in logical state 1 will the ith gate 106 assert a logical 0 signal on empty line (MT$_i$) 112, indicating that the ith register element does not sense an empty situation. Because the outputs of all gates 106 are connected in a conventional wired-OR configuration, only if none of the gates 106 asserts a logical 0, will empty line 112 remain in a logical 1 state indicating that data store 10 is empty.

Only if both the ith and the $i-1$ register elements 44 are in logical state 1 will the ith gate 110 assert a logical 0 signal on full line (F$_i$) 114 indicating that the ith register does not sense a full situation. Because the outputs of all gates 110 are connected in a conventional wired-OR configuration, only if none of the gates 110 asserts a logical 0 will full line 114 remain in a logical 1 state indicating that data store 10 is full.

Only if both the ith and the $$i+\frac{n}{2}+1$$

register elements 44 are in logical state 0 will gate 108 assert a logical 0 signal on half-full line, HF$_i$ 116, indicating that the ith register does not sense a half-full situation. Because the outputs of all gates 108 are connected in a conventional wired-OR configuration, only if none of the gates 108 asserts a logical 0, will half-full line 116 assume a logical 1 state, indicating that data store 10 is at least half full, but not entirely full. Local flag generator $n+1$ does not have a gate 108 and cannot assert a logical 0 signal on HF line 116.

Figure 6A:
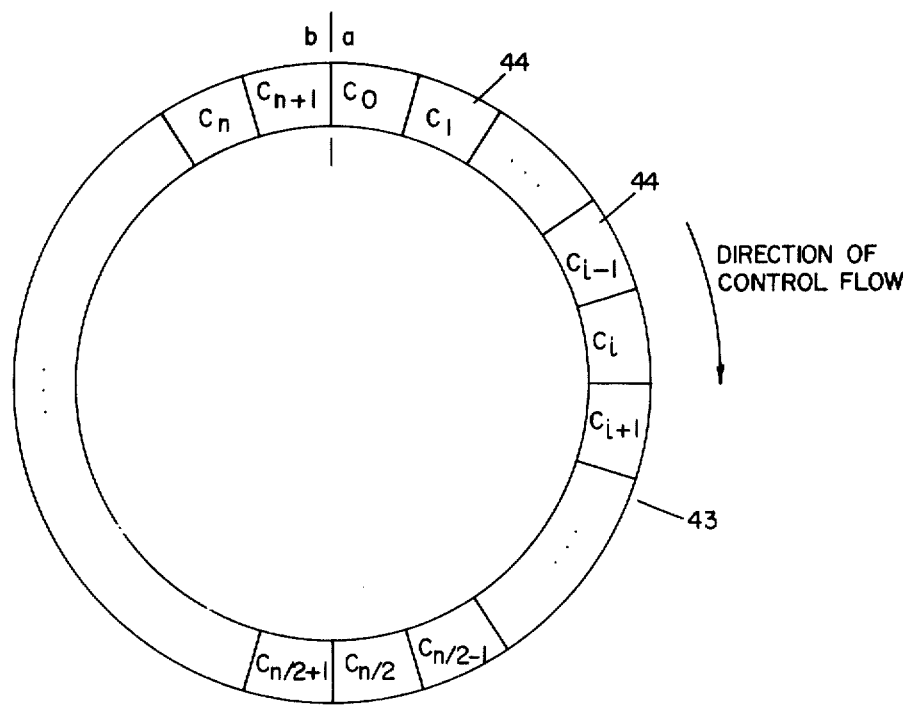
FIG. 6A is a schematic representation of the flow of control in the control register of FIG. 3A.
Figure 6B:
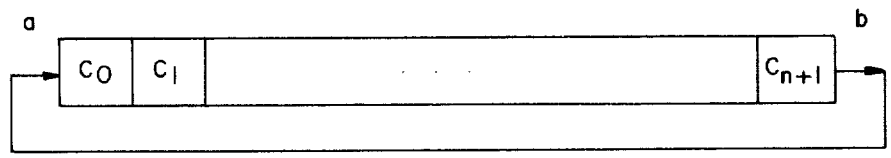
FIG. 6B and 6C are block diagrams of alternative configurations of the control register of FIG. 3A.
Figure 6C:
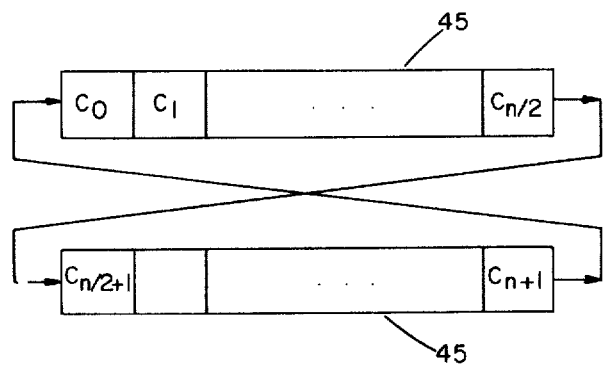

Referring to FIG. 6C, control register 42 can be physically implemented as two parallel linear sections 45, one section comprising register elements $C_o$ through and the other comprising register elements $$C_{\frac{n}{2}+1}$$

through $C_{n+1}$, with element $C_o$ located opposite element $$C_{\frac{n}{2}+1},$$

$C_1$ opposite $$C_{\frac{n}{2}+1}$$

and so forth. This permits an efficient physical arrangement of each NAND gate 108 close to the respective register elements which provide its inputs.

Figure 5C:
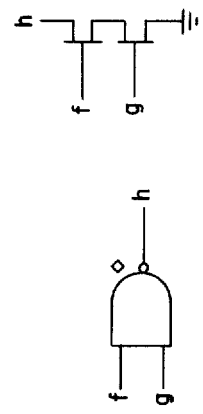
FIG. 5C is a circuit diagram of a representative gate of FIG. 5B.
Figure 5B:
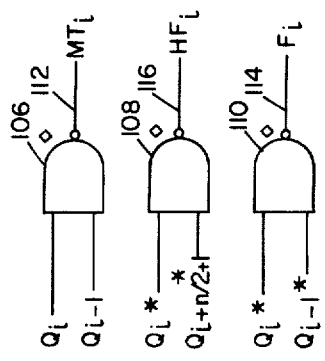
FIG. 5B is a block diagram of the gating circuitry of a representative local flag generator of FIG. 5A.

Referring to FIG. 5C, the open collector form of NAND gates 106, 108, 110 enables a wired OR configuration. For example, full line 114 is connected to output 114 of all n+2 gates 110. Full line 114 is also connected to a voltage source which keeps it at a logical 1 value until any one or more of gates 110 asserts a logical 0 which draws line 114 down to a logical 0 value. Therefore the logical values asserted by gates 110 are effectively summed on line 114. Empty line 112 and half full line 116 are arranged similarly.

Returning to FIG. 1, status latches 117 hold the values appearing on empty line 112, full line 114 and half full line 116 whenever data source 11 sends a write clock signal on line 130 or a status read signal on line 132. Latches 117 hold those values until the entire write or status read operation is completed.

If line 134 carries a not full signal (F*=logical 1) when a write signal appears on line 130, gate 136 permits the write clock signal to appear on line 28 to effectuate the write operation. If, however, a full signal (F*=0) appears on line 134 when a write signal is applied to line 130, inverter 138 and gate 140 cause a writing full memory signal to be applied to line 142, indicating to data source 11 that no more data words can be written into data store 10 and the requested write operation has not been performed. When a status read signal is applied to line 132, signals are provided by latch 117 on not full line 144, not half full line 146 and empty line 148. These signals can be used by data source 11 to determine the available capacity of data store 10.

Similar functions are provided between status latches 118 and data user 13 by gates 150, 152 and 154 and inverter 156 to provide a signal on reading empty memory line 180 when data user 13 attempts to read from an empty memory, and to permit data user 13 (by means of a status read signal on status read line 171) to find out the quantity of data words available for reading from data store 10, based on signals appearing on not empty line 190, half full line 192 and full line 194.

Interrupt controls 160, 162 interrupt data user 13 on interrupt line 168 and data source 11 on interrupt line 172 respectively whenever the quantity of data words available for reading or the quantity of stages 16 available for storage of data words (as indicated on lines 112, 114, 116) rises or falls to levels programmed on lines 164 and 166.

Referring to FIG. 7A, control register 42 is split at four points. The four resulting segments of control register 42 are segment 200 (register elements $C_o$ through $C_{p/2}$); segment 202 (register elements $$C_{\frac{p}{2}+1}$$

through $C_{n/2}$), segment 204

$$\left( C_{\frac{n}{2}+1} \text{ through } C_{\frac{n}{2}+\frac{p}{2}+1} \right)$$

and segment 206

$$\left( C_{\frac{n}{2}+\frac{p}{2}+2} \text{ through } C_{n+1} \right).$$

Conventional multiplexers 208, 210, 212, and 214 are inserted as shown between each pair of segments 200, 202, 204 and 206. Each multiplexer 208, 210, 212 and 214 transmits the signal from its "a" input when signal L is a logical 1 and transmits the signal from its "b" input when signal L is a logical 0. By appropriate provision of L signals (which serve as a length selector) to multiplexers 208, 210, 212 and 214, segments 200 and 204 can be made to operate as a shortened control register 42 having a capacity p, while all four segments 200, 202, 204 and 206 can alternatively be selected to operate as a full control register 44.

Referring to FIG. 7B, the write gate 48 for register element p/2 receives on its input line 63 either state $$Q_{\frac{n}{2}+1}$$

or state $$Q_{\frac{p}{2}+1}$$

depending on the condition of multiplexer 220, as determined by the signal L. Referring to FIG. 7C, the write gate 48 for register element $$\frac{n}{2} + \frac{p}{2} + 1$$

receives on its input line 63 either state $Q_o$ or state $$Q_{\frac{n}{2}+\frac{p}{2}+1},$$

depending on the condition of multiplexer 222, as determined by the signal L. These gates 48 assure the proper read and write signals for the two different length control registers.

Referring to FIG. 7D, signals are generated on half full line 116 for the split control register 42 shown in FIG. 7A. NAND gates 108 for generating signals $HF_o$ through are connected together in a wired OR-configuration to provide the half-full signals on line 116 when the shortened control register 42 is in use. When the full control register 42 is in use, NAND gate 224 is enabled by signal L and, in conjunction with inverter 226, add NAND gates 108 for generating signals $$HF_{\frac{p}{2}}$$

through $$H_{\frac{n}{2}}$$

to the wired OR line 116.

Similarly, FIG. 7E shows the generation of the signals on full line 114 for the split control register 42 of FIG. 7A. NAND gates 110 for generating signals $F_o$ through $$F_{\frac{p}{2}} \text{ and } F_{\frac{n}{2}+1} \text{ through } F_{\frac{n}{2}+\frac{p}{2}+1}$$

are connected in a wired OR configuration to full ine 114. NAND gate 228 and inverter 230 enable NAND gates 110 for generating signals $$F_{\frac{p}{2}+1} \text{ through } F_{\frac{n}{2}}$$

to be connected to full line 114 when signal L is applied to NAND gate 228.

OPERATION

Referring to FIG. 6A, control register 42 can be represented as a continuous ring 43 of register elements 44 in which element $C_{n+1}$ is attached to element $C_o$. (FIG. 6B illustrates the linear version of ring 43 and corresponds to control register 42 in FIG. 3A.) Each register element 44 contains, at a given time, a logical 1 or a logical 0, and together the register elements 44 serve as pointers to the stages 16 of data store 10 to indicate which stages 16 contain data words, which stage 16 is to receive the next-in data word, and which stage 16 is to provide the next data word to be read. Ring 43 always holds a single subset of contiguous 1's containing at least a single 1 and a single subset of contiguous 0's containing at least a single 0. For the direction of control flow shown in FIG. 6A, the predecessor of register element i is register element i−1 and the successor of i is i+1. The ring head is defined as that register element containing a 1 whose successor contains a 0. The ring tail is defined as that register element containing a 1 whose predecessor contains a 0. If ring 43 contains a single 1, data store 10 is empty; if ring 43 contains a single 0, data store 10 is full. The ring head always indicates the next stage 16 to be written and the ring tail the next stage 16 to be read. Any 1's between the ring head and the ring tail indicate stages 16 which contain data words.

The operation of the system begins by applying a "clear" signal on line 82 which causes a 1 to be loaded into the first register element ($C_o$) 44 and 0's to be loaded into all other register elements 44. Data store 10 is then empty, as indicated by the existence of only a single 1 in control register 42, and the single 1 in register element $C_o$ is both the ring head and the ring tail.

Data source 11 can be continually making a data word available on input data line 12, and the data word is continually written into the stage corresponding to the ring head, that stage being enabled by the write gate signal from gate 48 associated with that stage. By providing a write clock signal on line 130 (which is then carried on line 28), data source 11 causes narrow clock generator 64 to issue a CWR* signal (at the end of the write clock signal), causing the register elements to shift their status. The ring head is then advanced to the next stage causing the data word which had previously been written to be automatically stored in the stage associated with the former ring head. Data source 11 can then write the next data word continuously into the stage associated with the new ring head until the ring head is shifted again in response to a CWR* signal.

When data user 13 wishes to read from data store 10, which can be done at the same time and at a different rate of speed from the write operation, a read clock signal is provided on line 170 and, provided that data store 10 is not then empty (in which case a reading empty memory signal would appear on line 180), data can be read out on line 14 from the stage 16 corresponding to the ring head, and immediately thereafter all register elements 44 are updated so that the former ring tail adopts an 0 status and all other register elements 44 remain unchanged.

The ring head and ring tail are never at the same register element, except when data store 10 is empty, so that reading by data user 13 and writing by data source 11 can occur essentially at the same time, and at different rates of speed without interference.

FIGS. 4A and 4B show two sequences of read and write operations and indicate the states of register elements 42 and the status of the full, half full and empty indicators (and their inverses) immediately after each step is executed. A read operation must not occur after step 1, 1b or step 3b (when data store 10 is empty); otherwise control register 42 will lose its ring head. Reading of an empty data store is prevented either by programming data user 13 to status read before reading data or by hardware implementation as part of interrupt control 160. Similarly data source 11 must not write after step 6a or step 8b (when data store 10 is full); otherwise control register 42 will lose its ring head and its ring tail.

By virtue of the use of n+2 stages to control an apparent n data word data store, the ring head always points to the next stage to be written, even when data store 10 is "full". The ring tail and ring head are always separated by at least one 0, ensuring that reading and writing always occur in different stages 16. A write clock input to each controller 40 is not required since writing in one stage can be done continuously until the ring head is advanced to the next stage. Accurate full, half full and empty status indicators can be provided without requiring auxiliary memories.

Data user 13 and data source 11 can determine the available capacity of data store 10 by asserting status read signals respectively on lines 171 and 132.

Interrupt controls 160 and 162 are arranged to signal data user 13 and data source 11 respectively whenever the available capacity of data store 10 reaches particular levels.

Figure 8A:
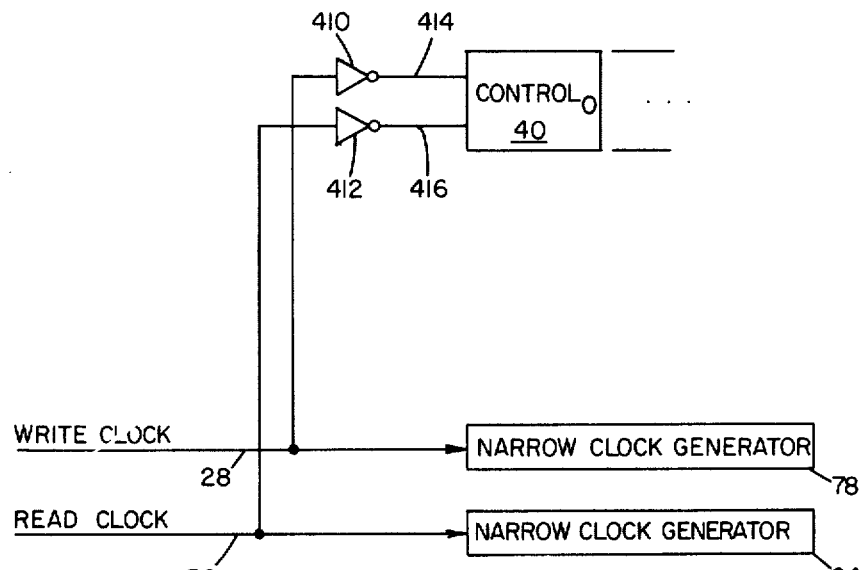
FIGS. 8A and 8B are block diagrams of direct read clock and write clock signaling circuits for the control elements of FIG. 3A.
Figure 8B:
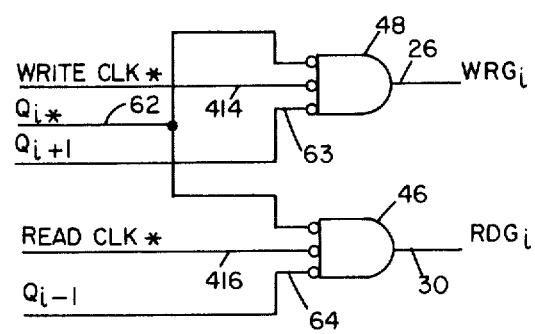

Other embodiments are within the following claims. For example, referring to FIGS. 8A and 8B, write clock and read clock lines 28 and 32 are connected through inverters 410, 412, respectively, and lines 414, 416 to gates 48 and 46 of each control element 40. Gates 48 and 46 then provide appropriate their read enable (RDG$_i$) and write enable (WRG$_i$) signals to the proper stages of the data store only when write or read signals are delivered on lines 28, 32, rather than continuously.

I claim:

1. Apparatus for controlling the loading into a data store of a sequence of data words and the reading from said data store of said data words in the same said sequence, said data store comprising a plurality of stages, said apparatus being arranged for determining the next-to-be-read and next-to-be-loaded stages of said data store comprising:

pointer circuitry connected to specify the next-to-be-loaded one of said stages and to specify independently the next-to-be-read one of said stages, a loader responsive to said pointer circuitry and connected to enable loading said next data word in said sequence to be loaded, a reader responsive to said pointer circuitry and connected to enable reading, independently of said loader, said next data word in said sequence to be read, and pointer update circuitry for updating the status of said pointer circuitry after each said loading and after each said reading, said pointer circuitry comprising a register of elements each element occupying one of two possible states and each element associated with one of said stages, said elements residing in states which depend on which of said stages contain data words, said states being indicative of which stages are the next-to-be-loaded and the next-to-be-said next to be read and next to be loaded stages being specified by particular ones of said elements based on the states occupied by at least some of said elements.

2. The apparatus of claim 1 wherein said stages are arranged consecutively and said data words in said sequence are loaded respectively into consecutive said stages, and wherein said elements in said register are arranged effectively in a continuous ring, each of said elements being in a first state when the corresponding stage either contains a data word or immediately succeeds the stage containing the last loaded said data word, each of said elements otherwise being in a second state, whereby said next-to-be-loaded one of said stages is specified by the corresponding element which is in said first state when the next succeeding said element is in said second state, and said next-to-be-read one of said stages is specified by corresponding said element which is in said first state when the immediately preceding said element is in said second state.

3. The apparatus of claim 1 or 2 further comprising load timing circuitry connected to trigger said loader to enable said loading.

4. The apparatus of claim 1 or 2 further comprising read timing circuitry connected to trigger said reader to enable said reading.

5. The apparatus of claim 1 or 2 further comprising control circuitry connected to disable said loader when said data store is full.

6. The apparatus of claim 5 wherein said data store is treated as full when all but two of said stages contain said data words.

7. The apparatus of claim 1 or 2 further comprising control circuitry connected to disable said reader when said data store is empty.

8. The apparatus of claim 2 wherein said pointer update circuitry comprises load update circuitry responsive to the completion of said loading of each said data word and connected to cause the element succeeding said element which had specified said next-to-be-loaded one of said stages to change to said first state, and read update circuitry responsive to the completion of said reading of each said data word and connected to cause the element which had specified said next-to-be-read one of said stages to change to said second state.

9. Apparatus for indicating the level of occupancy of a data storage system having a sequence of stages, said apparatus comprising occupancy sensing circuitry responsive to said stages and connected to indicate whether or not different ones of said stages are occupied by data, and half-full flag circuitry responsive to said occupancy sensing circuitry and connected to indicate when at least half of said stages are occupied by data.

10. The apparatus of claim 9 wherein said sequence is split into two sub-sequences having equal numbers of said stages, each said stage in each of said sub-sequences being associated with one of said stages of the other said sub-sequence, and said half-full flag circuitry comprises a plurality of half-full indicators, each of said indicators being associated with one of said stages in one of said sub-sequences and with the corresponding stage in the other said sub-sequence, each of said indicators being connected to provide an at-least-half-full signal when both of its associated said stages are occupied.

11. The apparatus of claim 9 further comprising:

full flag circuitry responsive to said occupancy sensing circuitry and connected to indicate when all of said stages are occupied.

12. The apparatus of claim 9 further comprising empty flag circuitry responsive to said occupancy sensing circuitry and connected to indicate when all of said stages are unoccupied.

13. The apparatus of claim 11 wherein said full flag circuitry comprises a plurality of not-full indicators, each of said indicators being associated with one of said stages and with the preceding stage in said sequence, each of said indicators being connected to provide a not-full signal when both of said associated stages are unoccupied.

14. The apparatus of claim 12 wherein said empty flag circuitry comprises a plurality of not-empty indicators, each of said indicators being associated with one of said stages and with the preceding stage in said sequence, each of said indicators being connected to provide a not-empty signal when both of said associated stages are occupied.

15. A data store for first-in, first-out storage of a sequence of data words comprising
   a plurality of storage stages,
   linking circuitry for enabling different predetermined numbers of said storage stages to be available at different times for said storage of data, and
   size selector circuitry for causing said linking circuitry to enable a particular one of said predetermined numbers of said storage stages to be available at a particular time.

16. The data store of claim 15 further comprising a sequence of enabling elements, each of said elements being associated with one of said stages for enabling the corresponding one of said stages to be loaded or read, said sequence being split into a first part and a second part, and wherein said linking circuitry selectably connects or disconnects said first part and said second part.

17. The apparatus of claim 16 wherein each of said first and second parts is split into a first subpart and a second subpart, said first subparts having equal numbers of said elements and said second subparts having equal numbers of said elements, and said linking circuitry further comprises four multiplexers, one of said multiplexers connecting each two of said subparts, said apparatus further comprising:
   occupancy sensing circuitry connected to indicate the occupied or unoccupied states of each of said stages, and
   half-full flag circuitry responsive to said occupancy sensing circuitry and connected to selectably indicate when at least half of said stages, or at least half of said stages associated with said first part, are occupied.

* * * * *

UNITED STATES PATENT AND TRADEMARK OFFICE
CERTIFICATE OF CORRECTION

PATENT NO. : 4,486,854
DATED : December 4, 1984
INVENTOR(S) : William Yuni

It is certified that error appears in the above-identified patent and that said Letters Patent are hereby corrected as shown below:

Column 2, line 8, a period is omitted.

Column 2, line 59, a period is omitted.

Column 2, line 68, a period is omitted.

Column 4, line 51, "$Q_{i-1}$" should be --$Q_{i+1}$--.

Column 5, line 67, "($WRC_i$) should be --($WRG_i$)--.

Column 6, line 58 "108" should be --110--.

Column 7, line 32, "114" should be --44--.

Column 7, line 65, "168" should be --172--.

Column 7, line 66, "172" should be --168--.

Signed and Sealed this

Twenty-ninth Day of October 1985

[SEAL]

Attest:

DONALD J. QUIGG

Attesting Officer

Commissioner of Patents and
Trademarks—Designate